United States Patent
Fournier et al.

(10) Patent No.: US 7,519,397 B2
(45) Date of Patent: Apr. 14, 2009

(54) SYSTEM FOR DOWNLOADING MULTIMEDIA CONTENT AND ASSOCIATED PROCESS

(75) Inventors: Jean-Philippe Fournier, Sunnyvale, CA (US); Georges Passet, Cernay la Ville (FR)

(73) Assignee: Bouygues Telecom, Boulogne Billancourt (FR)

( * ) Notice: Subject to any disclaimer, the term of this patent is extended or adjusted under 35 U.S.C. 154(b) by 294 days.

(21) Appl. No.: 10/672,213

(22) Filed: Sep. 25, 2003

(65) Prior Publication Data
US 2004/0121815 A1 Jun. 24, 2004

(30) Foreign Application Priority Data
Sep. 26, 2002 (FR) .................... 02 11946

(51) Int. Cl.
*H04M 1/00* (2006.01)
(52) U.S. Cl. ..................... 455/563; 455/414.1
(58) Field of Classification Search ................ 455/563, 455/414.1; 709/203, 231; 379/201.05
See application file for complete search history.

(56) References Cited

U.S. PATENT DOCUMENTS

| | | | | |
|---|---|---|---|---|
| 5,594,779 A | * | 1/1997 | Goodman | ............... 455/3.04 |
| 6,345,250 B1 | * | 2/2002 | Martin | ..................... 704/260 |
| 6,754,335 B1 | * | 6/2004 | Shaffer et al. | .......... 379/266.02 |
| 6,965,770 B2 | * | 11/2005 | Walsh et al. | ............. 455/426.1 |
| 6,996,393 B2 | * | 2/2006 | Pyhalammi et al. | ...... 455/412.1 |
| 2002/0107695 A1 | * | 8/2002 | Roth et al. | ................... 704/275 |

FOREIGN PATENT DOCUMENTS

| | | |
|---|---|---|
| EP | 0 676 882 A2 | 10/1995 |
| WO | WO 01/69928 A2 | 9/2001 |

\* cited by examiner

*Primary Examiner*—Sam Bhattacharya
(74) *Attorney, Agent, or Firm*—Blakely, Sokoloff, Taylor & Zafman LLP

(57) ABSTRACT

The invention relates to a system for downloading multimedia content via a mobile telephony network (10) to a terminal (50; 60, 70), comprising a voice recognition device (40), a database (30) connected to the network (10) and containing multimedia files. The terminal (50; 60, 70) transmits a voice request to the voice recognition device (40) and the voice recognition device (40) interprets the request that it receives. After the request has been received and interpreted by the voice recognition device (40), one or more interpretation prompt(s) designating one or more file(s) contained in the database (30) are sent to the terminal (50; 60, 70). The terminal is able to return a prompt selected, thereby bringing about the downloading of a file corresponding to the prompt selected from the database (30) to the terminal (50; 60, 70) via the mobile telephony network (10).

22 Claims, 1 Drawing Sheet

SYSTEM FOR DOWNLOADING MULTIMEDIA CONTENT AND ASSOCIATED PROCESS

BACKGROUND OF THE INVENTION

1. Field of the Invention

The invention relates to the field of browsing the Internet or any other network (GSM, GPRS, UMTS) regardless of the protocol used (WAP, I-Mode, etc.) by virtue of a mobile terminal or a computer.

2. Description of the Related Art

Systems are known which make it possible to access Internet sites in which the user connects to a server that allows him to establish contact with other servers and to obtain information.

The document U.S. Pat. No. 6,101,473 describes a browsing system comprising a web server, a PC type computer terminal including a web browser and a voice recognition device coupling the server with a standard telephony network (of wire type). The voice recognition device is able to interpret a browsing voice command issued by the user from his telephone set linked to the standard telephony network and to control the web server as a function of this interpretation. The web server is able to return graphical data to the computer terminal, as a function of the voice command issued by the user. This browsing system allows a user to browse the Internet by formulating natural-language browsing or downloading orders from his fixed telephone.

By virtue of such systems, the user can download multimedia content to his computer terminal by verbally formulating his request from his fixed telephone set.

A drawback of these systems is that they are based on the parallel use of a computer terminal and a fixed telephone and that they comprise relatively complex means of operation.

Another drawback of these systems is that the voice recognition device does not always carry out correct interpretation of the user's requests. In particular, when the user is in a noisy environment, his voice may be distorted and the content of his request may be impaired thereby.

It follows that the multimedia content that he receives does not correspond to what he requested.

This drawback is particularly detrimental in the case where the user orders the downloading of a film, of a video or sound sequence (radio or television transmission), of an animation, of a program,.etc.

Specifically, the downloading of the files may prove to be relatively lengthy and hence expensive for the user.

Moreover, the downloading of content may form part of a pay service.

SUMMARY

It is desirable for the user's requests to be correctly interpreted so as to avoid any futile downloading.

For this purpose, the invention proposes a system for downloading multimedia content to a terminal, characterized in that the downloading is carried out via a mobile telephony network, the said terminal being able to be connected to the mobile telephony network, the said system comprising a voice recognition device, a database connected to the network and containing multimedia files, the terminal being able to transmit a voice request emanating from the user to the voice recognition device and the voice recognition device is able to interpret the request that it receives and to return to the terminal one or more interpretation prompt(s) designating one or more file(s) contained in the database, the terminal being able to return a prompt selected by the user, thereby bringing about the downloading of a multimedia file corresponding to the prompt selected from the database to the terminal via the mobile telephony network.

This system advantageously allows the user to verify that his request has been correctly interpreted before confirming the downloading of a file. This system therefore avoids any futile downloading.

This system applies to terminals such as mobile telephones equipped with Internet browsers, computers linked to or incorporating a terminal for connection to the mobile network, electronic diaries, personal assistants, etc., able to exchange information via the mobile telephony network and to receive data files.

These terminals make it possible to browse the Internet, to download data, to use specific means of selection comprising for example a touch screen and a stylus.

By using such terminals, the user confirms his request in a simple and fast manner before the downloading of the corresponding multimedia content is performed.

In an implementation of the invention, the voice recognition device is able to generate and transmit to the terminal a list containing several most probable interpretation prompts.

The prompts can be transmitted to the terminal in the form of hypertext links tied with multimedia files contained in the database, the user being able to activate the link corresponding to his request.

Advantageously, the prompts being associated with probabilities of correspondence with the user's request, they may be ranked according to their order of probability.

This arrangement allows a further reduction in the time required by the user to choose the content that he desires to download.

Advantageously, the system may comprise means for recording the voice request.

Advantageously, the terminal is a mobile terminal having a voice channel (via which analogue signals or digital data can travel) and/or a data channel.

In an implementation of the invention, the system comprises means for activating or deactivating the mode of operation with return of interpretation prompt(s) to the terminal and:

in the case where this mode of operation is activated, the voice recognition device is able to return one or more interpretation prompt(s) to the terminal, in the case where this mode of operation is deactivated, the voice recognition device is able to transmit an interpretation directly to a server for access to the database.

Advantageously, the terminal comprises means for measuring a parameter relating to the quality of the network and as a function of this parameter, activating or deactivating the mode of operation with return of prompt(s).

Alternatively, the means for activating or deactivating the mode of operation with return of prompt(s) to the terminal can be actuated by a user of the terminal.

The invention also relates to a process for downloading multimedia content to a terminal, characterized in that the downloading is carried out via a mobile telephony network, the said terminal being able to be connected to the mobile telephony network, said process comprising the steps according to which:

a user transmits a signal corresponding to a verbal request to a voice recognition device from a terminal via the mobile telephony network, the voice recognition device processes the signal and returns to the terminal one or more interpretation prompt (s) designating one or more multimedia file(s) contained in a database connected to the network, the user selects the prompt corresponding to the verbal request, thereby bringing about the downloading of a multimedia file corresponding to the prompt selected from the database to the terminal via the mobile telephony network.

The voice request signal may be a voice or data signal.

In an implementation of the invention, the prompts are returned from the database to the terminal in the form of a text message.

In another implementation of the invention, the prompts are returned from the database to the terminal in the form of a voice message transmitted as a sound file or by audio streaming.

Advantageously, the prompts are presented by the terminal in a descending order of probability of correspondence with the request.

In an implementation of the invention, a prompt is selected by positioning a cursor over this prompt then by pressing an enable key of a keypad associated with the terminal.

In the case where the telephone is fitted with a touch screen (allowing entry of information by simply pressing or moving the finger on the screen), a prompt is selected by positioning a stylus on the touch screen at the level of the relevant prompt.

In another implementation of the invention, a prompt is selected by scrolling prompts down to the one whose selection is desired and then by pressing an enable key of a keypad associated with the terminal.

In yet another implementation of the invention, a prompt is selected by pressing a key of a keypad associated with the terminal identifying the prompt.

In yet another implementation, a prompt is selected by verbally pronouncing a reference identifying this prompt.

When none of the prompts is selected, the operation of processing the request by the voice recognition device is repeated while eliminating the unselected prompts from a list of expressions that the voice recognition device may comprise.

Having recorded the voice request beforehand, this new processing operation may be carried out on the basis of the initial recorded request.

Alternatively, this new processing operation may be carried out on a new request.

When none of the prompts is selected, the new request may be formulated in text or graphics mode.

In an implementation of the invention, a mode of operation with return of prompt(s) to the terminal is activated beforehand.

BRIEF DESCRIPTION OF THE DRAWINGS

Other characteristics and advantages will emerge further from the description which follows, which is purely illustrative and nonlimiting and should be read in conjunction with the figure.

DETAILED DESCRIPTION

Figure 1:
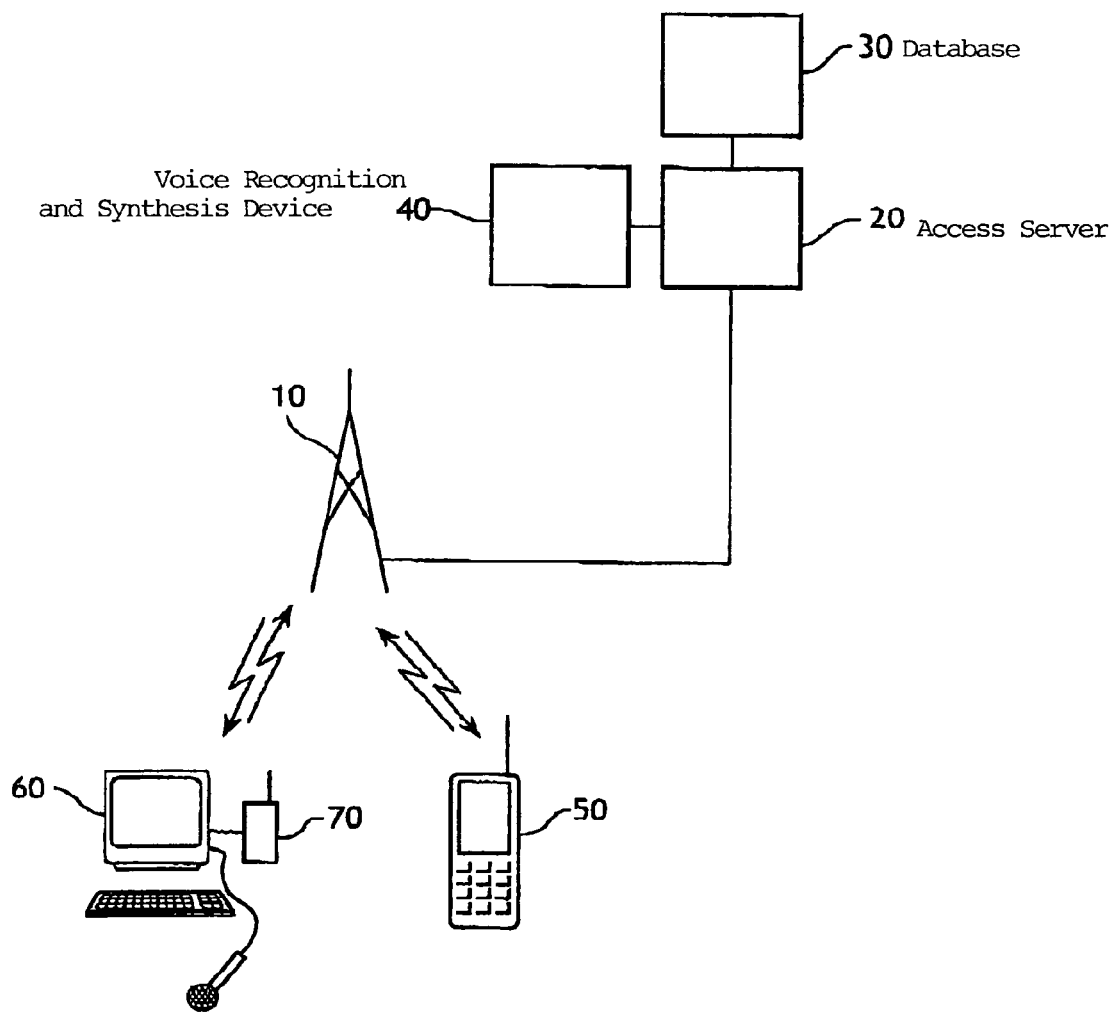
FIG. 1 is a diagrammatic representation of a downloading system in accordance with an embodiment of the invention.

In FIG. 1, the downloading system uses a mobile telephony network 10. This system comprises an access server 20 connected to the mobile telephony network 10. This access server 20 is also connected to a database 30 containing a collection of multimedia files and to a voice recognition and synthesis device 40.

Users can use the downloading system by means of a terminal able to exchange information via the mobile telephony network 10 and to receive data files. This may for example be a mobile telephone 50 equipped with a WEB or WAP Internet browser, or else a computer 60 linked to or incorporating a terminal 70 for connection to the mobile network 10. The terminal is in particular able to receive and interpret HTML pages. It is able to display hypertext and hypermedia links activatable by the user.

The terminal can also take the form of an electronic diary or personal assistant. These appliances generally comprise a touch screen and a stylus allowing the user to write on the screen or to select commands.

The user of a mobile telephone 50 searching for a multimedia content can connect up to the server 20 by browsing the Internet (using WAP, I-Mode or any other protocol) or by ordering direct access to this server 20. The mobile telephone 50 comprises a data channel and possibly a voice channel.

An HTML page is displayed on the screen of the mobile telephone 50 indicating to the user that he can search for a content by formulating a verbal request. This content may consist of a file containing a film, a video or sound sequence (radio or television transmission, music), an animation, a program, etc.

For example, if the user desires to download a film, he says the title of this film. His request is transmitted to the access server 20 in the form of a voice message or in the form of data packets. In the latter case, the mobile telephone 50 converts the voice signal of the user into data. The access server 20 records the request and transmits it to the voice recognition device 40. The voice recognition device 40 receives and interprets the user's request.

According to a first "without help" mode of operation, the voice recognition device 40 returns the most probable interpretation of the user's request to the access server 20. The access server 20 then orders the downloading of the file corresponding to the user's choice from the database 30 to the mobile telephone 50.

According to a second "with help" mode of operation, the voice recognition device 40 returns a collection of interpretation prompts interpreting the user's request to the access server 20. These prompts correspond to titles of films available in the database 30. Each of these prompts is associated with a probability of correspondence with the user's request.

According to a first variant of his system, the access server 20 transmits the collection of prompts to the mobile telephone 50 via the data channel in the form of a text message that is displayed on the screen of the telephone 50. These prompts are associated with probabilities of correspondence with the user's request and are displayed on the screen in descending order of probabilities.

The user of the terminal verifies that his request is indeed among the prompts displayed on his screen.

The user can select one of the prompts by moving a cursor onto the prompt in which he is interested or by designating the latter with a stylus or by scrolling the prompts and then enabling his choice by pressing an enable key of his keypad.

Alternatively, the prompts can be referenced by index numbers.

In this case, the user can select one of the prompts by typing in the index number of the prompt which interests him and by enabling his choice by pressing an enable key of his keypad.

He can also verbally pronounce the index number of the prompt which interests him.

The mobile telephone 50 returns the selected prompt to the access server 20. The access server 20 orders the downloading of the file corresponding to the user's choice from the database 30 to the mobile telephone 50.

Advantageously, the prompts can be sent by the access server 20 to the mobile telephone 50 in the form of hypertext links tied with files of multimedia contents from the database 30. The user can activate the link which is of interest to him. The mobile telephone 50 is then directly tied to the database for downloading of the selected file.

This file can be downloaded in compressed form. In this case, this file may be read by decompression software (a content reader). Such software can for example be included in the mobile telephone 50.

The access server 20 records data relating to the downloading operation and the identity of the mobile telephone 50 in a register. This register will serve to bill the user for the downloading service. For example, this service may be invoiced directly on his telephone bill or deducted from his subscription.

In the case where none of the prompts corresponds to his request, the user has the possibility of selecting the "none of these prompts" prompt. The mobile telephone 50 returns a cue to the access server 20, indicating that the user is not satisfied with the prompts proposed to him. The access server 20 again sends the user's request that it has recorded the voice recognition device. The voice recognition device proceeds to a new recognition on the basis of this recording by eliminating the interpretation prompts that the user has not selected.

This elimination consists in eliminating from a list of expressions that the voice recognition device may comprise, the prompts not selected by the user.

According to a second variant of this system, the access server transmits the collection of prompts in the form of a voice message to the mobile telephone 50. This message may be transported on the voice channel or the data channel. In both cases, it may be downloaded to the mobile telephone in the form of a sound file or else transmitted by "audio streaming" (sending and reading in real time of compressed audio data). As previously, these prompts are pronounced from the most probable to the least probable. The user selects one of the prompts by pressing a key of the terminal corresponding to the prompt that he desires to select.

Alternatively, the various prompts may be pronounced in succession and the user accesses the next prompt or validates the prompt just pronounced by pressing certain keys of his keypad.

Alternatively again, the user selects a prompt by verbally pronouncing a reference identifying this prompt. The prompts can for example be associated with letters or with index numbers. The user then pronounces the index number or the letter of the prompt in which he is interested.

According to a third variant of this system, the access server 20 transmits the collection of prompts via the data channel in the form of data as well as an associated voice message. The prompts are displayed on the screen of the mobile telephone 50 while the mobile terminal 50 reads the voice message. The voice message can consist of the list of prompts displayed or any other indication for the attention of the user. It may be a message of the type: "Please select one of the prompts display by clicking on the one that corresponds to your request". The voice message can be generated within the network (for example the voice recognition device 40 comprises a voice synthesis module) or by the telephone 50 itself.

In the three variants set forth above, the downloading system allows the user to verbally formulate his requests and to obtain a graphical reply simultaneously. The transmission and the displaying of prompts may be carried out even if no telephonic communication is established between the terminal 50 and the network 10. It follows that the voice channel is not permanently open.

When after several attempts, the voice recognition has not succeeded, the access server 20 prompts the user to enter his request using the keypad of the terminal 50 or to spell out the word or words corresponding to his request. In the case where the user spells out the word or words corresponding to his request, the voice recognition device 40 goes to alphanumeric recognition mode.

The mode of operation of the device "with help" is not necessarily activated permanently. In particular, in the case where the link between the terminal 50 and the network 10 is of good quality, the users' requests are generally transmitted and correctly interpreted by the voice recognition device 40. The mobile telephone 50 can comprise means for measuring a parameter relating to the quality of the terminal/network link and, as a function of the result of this measurement, for activating or deactivating the mode of operation "with help" of the downloading system.

This activation or deactivation of the mode of operation "with help" may also be carried out by the user himself.

Of course, the system described above may be implemented with a computer 60 instead of the mobile telephone 50. In this case, the computer 60 must be linked to or must incorporate a terminal 70 for connection to the mobile network 10 as well as to sound capture means.

The system may also be implemented with an electronic diary or a personal assistant that can be connected to a mobile telephony network.

Certain diaries or computers comprise a write recognition touch screen. If the user's request is poorly interpreted by the voice recognition device, the user can write his request on the touch screen.

It will be understood that the above-described content downloading system may be implemented with any equipment allowing access to a mobile telephony network.

The invention claimed is:

1. System for downloading multimedia content to a terminal (50, 60, 70) wherein the downloading is carried out via a mobile telephony network (10), the said terminal (50, 60, 70) being able to be connected to the mobile telephony network (10), said system comprising:
    a voice recognition device (40),
    a database (30) connected to the network (10) and containing multimedia files, the terminal (50, 60, 70) being able to transmit a voice request designating one or more file(s) contained in the database (30) emanating from the user to the voice recognition device (40) and the voice recognition device (40) is able to recognize the voice request that it receives, to convert said recognized voice request into a plurality of text requests, said text requests having most probably the same content as the recognized voice request and to return to the terminal (50, 60, 70) one or more possible text requests for confirmation by the user, the terminal being able to return one of the text request selected by the user, wherein a multimedia file corresponding to the selected text request is downloaded from the database (30) to the terminal (50, 60, 70) via the mobile telephony network (10), and
    wherein the voice recognition device (40) is able to generate and transmit to the terminal (50, 60, 70) a list containing several most probable text requests, the text requests being associated with probabilities of correspondence with the user's voice request, the text requests of the list of text requests are ranked according to their order of probability.

2. System according to claim 1, wherein the text requests are transmitted to the terminal (50, 60, 70) in the form of hypertext links tied with multimedia files contained in the database (30), the user being able to activate the link corresponding to his voice request.

3. System according to claim 1, comprising means for recording the voice request.

4. System according to claim 1, wherein the terminal (50) is a mobile terminal having a voice channel and/or a data channel.

5. System according to claim 1, wherein the terminal (50) includes an Internet browser.

6. System according to claim 1, comprising means for activating or deactivating the mode of operation with confirmation to the terminal (50, 60, 70) and:
- in the case where this mode of operation is activated, the voice recognition device (40) is able to return one or more text request(s) to the terminal (50, 60, 70),
- in the case where this mode of operation is deactivated, the voice recognition device is able to transmit an interpretation directly to a server (50) for access to the database.

7. System according to claim 6, wherein the terminal (50, 60, 70) comprises means for measuring a parameter relating to the quality of the network and as a function of this parameter, activating or deactivating the mode of operation with confirmation.

8. System according to claim 6, wherein the means for activating or deactivating the mode of operation with confirmation to the terminal (50, 60, 70) can be actuated by a user of the terminal (50, 60, 70).

9. A process for downloading multimedia content to a terminal (50, 60, 70), wherein the downloading is carried out via a mobile telephony network (10), the said terminal being able to be connected to the mobile telephony network (10), said process comprising:
- transmitting a signal by a user corresponding to a voice request designating one or more multimedia file(s) contained in a database (30) to a voice recognition device (40) from a terminal (50, 60, 70) via the mobile telephony network (10),
- the voice recognition device (40) recognizing the voice request, converting said voice request into a plurality of text requests, said plurality of text requests having most probably the same content as the voice request, and returning to the terminal (50, 60, 70) one or more possible text request for confirmation by the user,
- selecting the text request corresponding to the voice request by the user, and downloading of a multimedia file corresponding to the selected text request from the database (30) to the terminal (50, 60, 70) via the mobile telephony network (10), wherein the text requests are presented by the terminal (50, 60, 70) in a descending order of probability of correspondence with the voice request.

10. Process according to claim 9, wherein the voice request signal is a voice or data signal.

11. Process according to claim 9, wherein the text request is returned from the database (30) to the terminal (50, 60, 70) in the form of a text message.

12. Process according to claim 11, wherein a text request is selected by positioning a cursor over this request then by pressing an enable key of a keypad associated with the terminal (50, 60, 70).

13. Process according to claim 9, wherein the text requests are returned from the database (30) to the terminal (50, 60, 70) in the form of a voice message transmitted as a sound file or by audio streaming.

14. Process according to claim 9, wherein the user selects a text request by scrolling text requests down to the one whose selection is desired and then by pressing an enable key of a keypad associated with the terminal (50, 60, 70).

15. Process according to claim 9, wherein the user selects a text request by pressing a key of a keypad associated with the terminal (50, 60, 70) identifying this text request.

16. Process according to claim 9, wherein the user selects a text request by verbally pronouncing a reference identifying this text request.

17. Process according to claim 9, wherein the user selects a text request by positioning a stylus on a touch screen associated with the terminal, at the level of the relevant text request.

18. Process according to claim 9, wherein when none of the text requests are selected, the operation of processing the request by the voice recognition device (40) is repeated while eliminating the unselected text requests from a list of expressions that the voice recognition device (40) may recognize.

19. Process according to claim 18, wherein having recorded the voice request beforehand, the operation of processing the request by the voice recognition device is carried out on the basis of the initial recorded voice request.

20. Process according to claim 18, wherein the operation of processing the request by the voice recognition device is carried out on a new request.

21. Process according to claim 20, wherein when none of the text requests are selected, the new request is formulated in text or graphics mode.

22. Process according to claim 9, wherein a mode of operation with confirmation to the terminal (50, 60, 70) is activated beforehand.

* * * * *